Oct. 4, 1966 R. H. BECKMAN 3,276,048
SPRING ASSEMBLY
Filed March 3, 1964

INVENTOR.
RONALD H. BECKMAN
BY
ATTORNEYS

United States Patent Office 3,276,048
Patented Oct. 4, 1966

3,276,048
SPRING ASSEMBLY
Ronald H. Beckman, 27 Bank St., New York, N.Y.
Filed Mar. 3, 1964, Ser. No. 349,006
1 Claim. (Cl. 5—351)

This invention relates to a resilient load supporting assembly, and more particularly to a vented, bellows spring cushioning assembly, especially for furniture, mattresses, cushions, automotive and general transportation seating.

Supporting devices employing resilient hollow vented bellows springs have many unique advantages. Several variations of such assemblies and advantages resulting from each are set forth in U.S. patent application Serial No. 256,376, filed February 5, 1963, and entitled Molded Body Support, and Serial No. 348,934 filed March 3, 1964, entitled Molded Springs. In these assemblies, the resilient support is supplied solely by the wall characteristics of the springs, since the hollow interior of the springs is freely vented to the atmosphere to eliminate any pneumatic effects. Consequently, many variations in resilient support are readily achieved by controlling the wall characteristics such as wall thickness, angle of the bellows legs, wall materials and other factors.

Another important manner of controlling the resilient support characteristics of a bellows spring assembly is by the employment of controlled spacing patterns of the bellows springs. Each pattern made includes some closely spaced springs to present a sturdier characteristic in that zone of the article, and other more widely spaced springs to achieve a softer effect in that zone. The result of variations in spacing differentials is markedly pronounced when the bellows springs are intermeshed with each other since a multiple resilience effect occurs with intermeshing, causing the resistance to compression to increase greatly with each fraction of an inch of increased intermesh. Exact control of the resilient support characteristics of all portions of the assembly is therefore closely dependent on exact spacing of the individual springs in the previously calculated pattern. Yet, exact spacing of the springs is extremely difficult to achieve during assembly. Visual determination of spring spacing, and especially of spring intermesh, is difficult and often inaccurate. This is further complicated by unusually configurated springs, tapered springs, and varying wall characteristics. Moreover, even when the springs are properly spaced, they shift laterally too readily to become dislodged from the selected location, both during attachment of adjacent springs, and during normal usage of the assembly as furniture, in automotive equipment, or the like.

It is, therefore, an object of this invention to provide a bellows spring assembly with unique locating means for the springs capable of exactly positioning each spring, and of doing so easily and quickly. A complete pattern of bellows springs can be designed to produce a precisely calculated result, and then assembled in a matter of minutes, to achieve the exact desired pattern and resilient effect. Almost endless zonal variations can be easily achieved, even by an unskilled workman.

It is another object of this invention to provide a unique spring locator means in a bellows spring assembly, that also embraces unique anchoring means to maintain the springs in the selected pattern against shifting, and to do so over the entire useful life of the assembly. The anchoring is automatically accomplished when springs are applied to the spring support. The complete attachment of the large number of springs is achieved in minutes, with ease, without special skill or tools, and with complete confidence in the accuracy of location. Moreover, the novel anchoring means is simple in structure, and inexpensive both to manufacture and to assemble.

These and several other objects of this invention will readily become apparent to those skilled in the art upon studying the following specification in conjunction with the drawings, in which.

Figure 1:
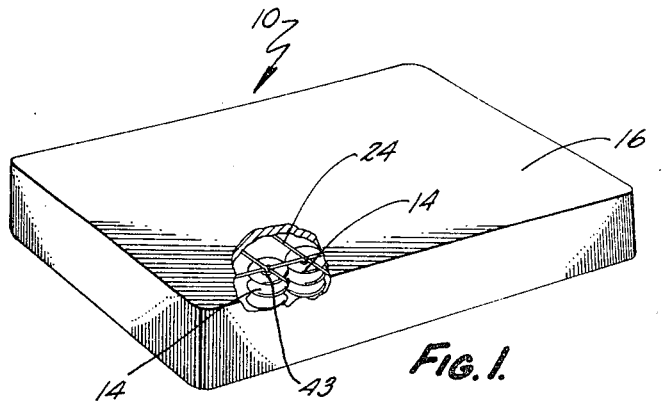
FIG. 1 is a perspective view of one form of the novel assembly.
Figure 3:
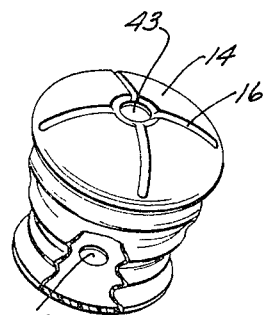
FIG. 3 is a perspective view of one of the bellows springs.

The novel assembly 10 as illustrated in FIG. 1 assumes the form of a resilient load supporting device which can be employed as an element of furniture, or in automotive seating, or as a cushion, or as a mattress, or in many other uses. The assembly includes a support panel 12 which may be rigid, semi-rigid, or generally flexible, a plurality of hollow, resilient, vented bellows springs 14, mounted on panel 12, spring locator and anchoring means 25, and cover means 16 extending over the top or upper ends of the bellows springs and around the peripheral edge for attachment to panel 12. The flexible cover means is not normally stretchable, and may comprise a cloth, plastic, or equivalent cover sheet. If desired, a layer 18 of foam material such as foam rubber, foam plastic or equivalent padding may be positioned over the springs and beneath the decorative cover sheet to prevent any feel of the springs by a person resting thereon.

Figure 2:
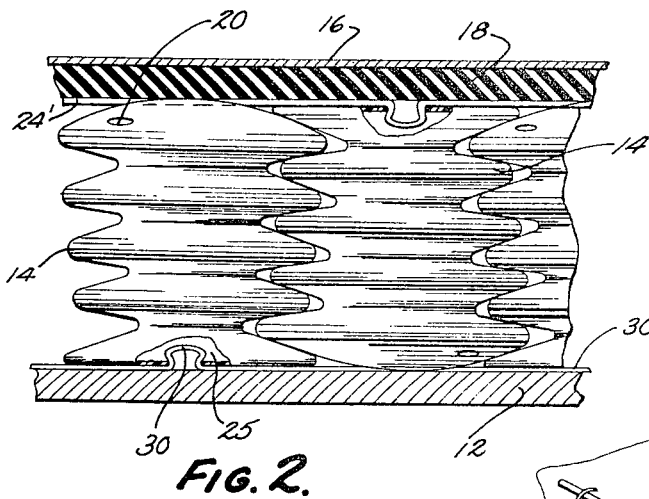
FIG. 2 is a side elevational, enlarged sectional view of a portion of the assembly illustrated in FIG. 1.

When the springs are to be mounted on panel 12, they are properly located in a pre-determined spacing pattern. This pattern may be uniform over the entire article, or may vary from zone to zone, depending upon the particular usage of the article, and the support required in each zone. Also, springs 14, may or may not be intermeshed as illustrated in FIG. 2. If intermeshed, they may be intermeshed varying degrees. If not intermeshed, they may be spaced from each other varying amounts. All of these gradations can be employed in the same article, if needed.

The cross-sectional configuration of the springs may be circular, ovular, polygonal, or irregularly shaped to suit the particular location, type of article and result desired. Also, the springs may be tapered from end to end, or from an intermediate section to the ends in any convergent-divergent relationship.

Each of the resilient bellows springs is formed of a polymeric material such as low density polyethylene, or other suitable polyolefins, including polypropylene butadiene polymers, propylene butadiene polymers, a polymer of ethyl acrylate mixtures or many others. Each spring is an integral unit formed of a plurality of interconnected individual bellows, having a pair of outwardly convergent legs terminating at outer junctures. The outer junctures are preferably arcuate in configuration to form a flexible hinge. The inner junctures may be slightly arcuate or sharp as necessary. The interior of each spring is hollow, forming an internal chamber freely vented to the atmosphere through suitable vents on the axial ends of the springs and/or the sides of the bellows as at 20.

Preferably, the springs are formed by blow-molding processes. The wall thickness of any portion of a blow-molded spring is generally inversely proportional to its distance from the axis of the spring and of the heated parison being blown. This desirably causes the outer junctures to be the thinnest and most flexible. The blow-molding process is also preferred because of the low cost of the dies, and the rapidity and accuracy of the process in reproducing springs. However, other processes can also be employed, such as rotational casting.

The resilient support supplied by each spring is a result of its wall characteristics, since the freely vented internal chamber of each spring prevents pneumatic interference during compression or expansion of the spring. The head of the spring, or the top bellows, may be enlarged to form a generally continuous upper surface with adjacent springs.

The cover means for the springs may include a foam pad, and the decorative cover sheet 16. Also, the base of each bellows spring may be enlarged, if desired, to provide more sturdy support, depending upon the type of spring, intermeshing and other factors.

If the springs are spaced from each other, each acts individually with the cumulative action of the several springs providing the resulting support. The cover means does distribute some of the force over adjacent springs to cause the zone of reaction to be larger than the immediate zone where the pressure is applied. When the springs are intermeshed, this zone of reaction is larger due to the unique movement of the force laterally between the springs, with a multiple effect resulting. This multiple support has been found to be greater than the cumulative effect of the individual springs, due to the fact that the resistance against compression is not only due to the wall characteristics of each spring, but also to the friction created between the sliding legs of the bellows when radially expanded under load, and due to the interference fit resulting as each bellows is forced to radially expand into a compressed groove between adjacent bellows of the adjacent spring. These factors are all clearly explained in the above identified patent application entitled Molded Spring.

The novel anchoring means of this invention, and the resulting assembly, achieves exact spacing of the springs with great ease, and with rapidity of assembly. The locating and anchoring means comprises a series of spaced wire rods 24 and 26, etc. secured to the panel 12 by any suitable means such as staples 28. These are spaced apart at predetermined intervals. Each of the wire rods includes a plurality of upwardly extending protrusions 30 having a generally looped shape in the form of an incomplete circle. These wire rods or elements are preformed before attachment to the panel from conventional wire rod stock of desired size, hardness, and resilience characteristics, to suit the particular size of bellows spring associated therewith. These wire rods have their loops at particular spacings with respect to each other, and selected to determine the spacings of the adjacent bellows springs. Thus, some may be closer together than others and may, for example, vary gradually from side to side of panel 12 to provide gradually varying spring spacings. In one zone, as at 32, therefore, these springs may be caused to intermesh, while in another zone, as at 34, the springs may be fairly widely spaced from each other. The distance between adjacent wire rods can also be accurately controlled to determine this effect.

Figure 4:
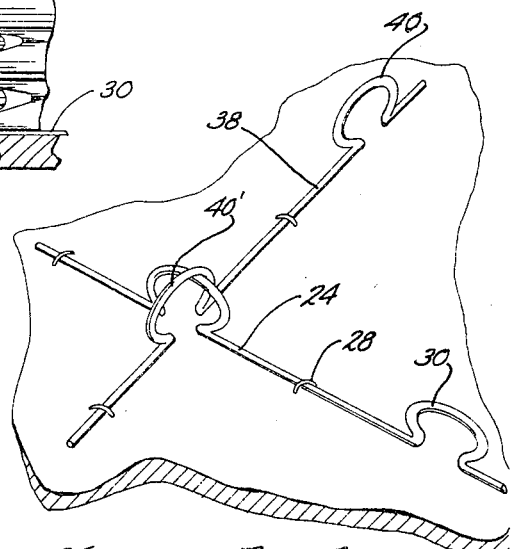
FIG. 4 is a fragmentary, enlarged perspective view of a portion of one form of the novel anchoring means shown in one particular arrangement on a support.
Figure 5:
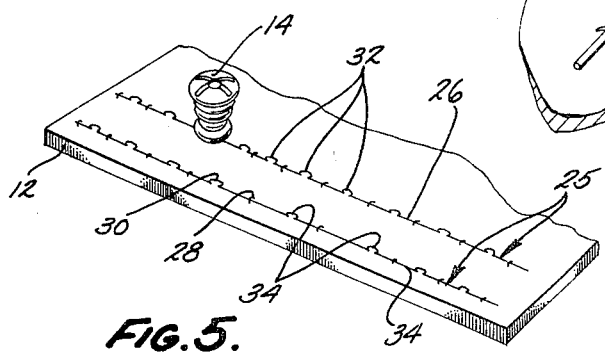
FIG. 5 is a fragmentary perspective view showing a slightly different form of the novel anchoring means mounted on a support panel and with a representative bellows spring attached.

Instead of a plurality of individual rods, a complete interconnected mesh of these elements may be formed. The cross elements for the rods may or may not include loop elements. In other words, the cross elements may be wound or welded to the wire rod elements to secure them in a predetermined pattern. The cross elements may also include loops. These loops can coincide with the loops of the main elements. In FIG. 4, for example, the cross elements 38 and the main wire rod elements 24 both have loops. Thus, the main rod element 24, stapled to the panel by suitable staples 28 includes a series of spaced loops 30, while the cross connecting wire rod 38 includes a series of loops 40, one of which is shown not coinciding with other loops and the second of which (40') coincides with one of the loops of element 24, to form a 3-dimensional protrusion extending upwardly from panel 12. These two coincident loops may be secured together by weldment, by a tie, or may just overlap as desired. When a mesh of such elements is employed (see FIG. 1 for example), the mesh extends in two dimensions across the ends of springs 14.

Each of the springs 14 associated with these anchoring elements includes an opening 42 in the axial end thereof and adjacent to panel 12. This opening preferably has a slightly smaller diameter than the largest diametral portion of the wire protrusions to thus require temporary deformation and stretching of the spring opening when being placed over the protrusion. This secures the spring to the protrusion and anchors it against vertical displacement as well as lateral displacement. The wires on the upper ends are preferably recessed into the springs by fitting within preformed radial grooves 46 in each spring. These are useful with anchoring wire rods employed at the upper ends of the springs as at 24' in FIG. 2 to minimize the possible feel of the wire elements to the person using the support. In some instances, it is advisable to use the anchoring wire rods only on the lower ends of the springs. In others, it is advisable to use them on both ends. This not only substantially lessens "feel" of the wires, but also prevents telegraphing of the wire outline through the cover layer. These grooves need not always be placed in the lower spring ends since the lower wires then elevate the spring enough to allow bottom nesting of the spring.

When each spring is attached to a protrusion by pressing the spring over the protrusion, the loop 30 extends up into the hollow chamber 25 of the spring (FIG. 2). The hollow chamber is vented past the loop and between the support wires. Supplemental venting outlets may be provided if necessary.

To assemble a plurality of the vented resilient bellows springs at particular spacings and locations, the spacing pattern for the article is previously calculated for optimum zonal and over-all resilience. Then wire rod elements 24 of necessary diameter, length, configuration, loop size, and loop spacing are selected for each zone of the article. Each is then anchored to the article as by staples 28 or any other equivalent attachment means. The individual wire rods 24 are placed at the proper spacing from each other across the panel. Cross tie members, if used, may then be attached. Alternatively, the cross ties may be previously attached to create a mesh. Then the appropriate bellows spring is pressed over each protrusion to "pop" the loop shaped protrusion into the slightly smaller diameter hole 42.

Conceivably, within the broader aspects of the invention, the opening 42 could be oblong so that the spring is inserted with its oblong opening dimension over the width of the loop, and then is rotated to anchor it.

All or a substantial share of the springs are attached to the protrusions. In some instances, only part of intermeshed springs need be attached since the others are retained by the surrounding springs.

If an upper anchoring series of wire rods are employed, they are popped into the upper openings 43 (FIG. 1). Then the cover means 16 including a decorative sheet and usually a pad, is placed over the upper ends of the springs and envelops them, including the peripheral edge for attachment to panel 12. The assembly is then complete. The assembly can be rapid, is readily adapted to mass production techniques, and requires no special skills. Workman can be guided by a simple color code or member code for each article. Yet, each spring is not only exactly located, but is prevented from lateral shifting when other springs are assembled with it, and also during usage. In spite of this anchoring action, the springs can be removed when necessary by a simple lift on each spring. Thus, mistakes in assembly can be rectified without scrapping either part or all of the article. These are only a few of the advantages resulting from this combination.

Several other advantages will be readily apparent to those dealing with this art.

Many obvious modifications can be employed on the illustrated structure to satisfy particular usage requirements, while employing the inventive principles taught. These obvious modifications are therefore deemed to be part of this invention, which is to be limited only by the scope of the appended claim and the reasonably equivalent structures to those defined therein.

I claim:

A load support assembly, comprising: a support panel; a plurality of spaced wire rods mounted on said panel; each of said wire rods including a plurality of spaced loops; a plurality of resilient, hollow, vented bellows springs supported on said panel; at least some of said springs having openings in the lower ends thereof, receiving said loops to locate said springs; and the diameter of portions of said openings being smaller than the diameter of said loops to anchor said springs.

References Cited by the Examiner

UNITED STATES PATENTS

| | | | |
|---|---|---|---|
| 2,150,747 | 3/1939 | Naulty | 5—348 |
| 2,350,711 | 6/1944 | Amos | 5—348 |
| 2,792,112 | 5/1957 | Ellis | 206—65 |
| 2,864,434 | 12/1958 | Flint | 267—81 |
| 2,975,892 | 3/1961 | Leavitt | 206—654 |
| 2,979,739 | 4/1961 | Krakauer | 5/345 |
| 3,201,111 | 8/1965 | Afton | 267—1 |

FOREIGN PATENTS 1,148,718  5/1963  Germany.

FRANK B. SHERRY, *Primary Examiner.*

CASMIR A. NUNBERG, *Examiner.*